April 26, 1966  E. M. BURDICK  3,248,301
METHOD FOR RECOVERING CAROTENOIDS AND PHYTOL FROM PAPAYA PLANTS
Filed July 20, 1964  3 Sheets-Sheet 1

Everette M. Burdick
INVENTOR.

BY

ATTORNEYS

United States Patent Office 3,248,301
Patented Apr. 26, 1966

3,248,301
METHOD FOR RECOVERING CAROTENOIDS AND PHYTOL FROM PAPAYA PLANTS
Everette M. Burdick, 4821 Ronda St., Coral Gables, Fla.
Filed July 20, 1964, Ser. No. 383,891
7 Claims. (Cl. 195—2)

The present invention relates to a novel method of recovering carotenoids, and more particularly, to a method of recovering carotenoids from papaya plants. The term papaya plants as used in the following specification and claims includes all the species of papaya including, by way of example: *Carica papaya* Linn. family Caricaceae; *Carica candamarcencis*, Hook.; *Carica dodecaphylla*; *Carica quercifolia*, Solms.; *Carica hastaefolia*, Solms.; *Carica gracilis*, Solms.; *Carica monoica*; *Carica cauliflora*; *Carica chrysopeala*; *Carica pentagona*; *Papaya Carica*, Gaertn.; *Vasconcellosia hastata*, Caruel; and Apocynaceae.

The present invention as disclosed hereinafter is illustrated in connection with its application in recovering the carotenoids known as carotenes and xanthophylls from papaya plants as well as recovering phytol from papaya plants. The carotenes are highly unsaturated hydrocarbons having the formula $C_{40}H_{56}$, and the principal carotenes found in the papaya plant are alpha-carotene and beta-carotene although there are more than twenty known carotenes at the present time.

The xanthophylls are the oxygen containing carotenoids, that is, they contain the hydroxy, keto, and hydroxy-keto groups, and lutein or leaf xanthophyll is the predominating xanthophyll in papaya plants. Lutein contains two hydroxyl groups as indicated by the formula $C_{40}H_{54}(OH)_2$.

Beta-carotene and lutein are the most important carotenoids from a commercial point of view at the present time, these two being widespread in nature including the green coagulum by-product obtained in the recovery of proteolytic enzymes from papaya plants as disclosed and claimed in my copending application Serial No. 1,050, now U.S. Letters Patent No. 3,141,832.

Neither the carotenes nor the xanthophylls occur in plants in a single form, for example, beta-carotene almost always occurs along with alpha-carotene. Likewise, as many as twelve different xanthophylls have been isolated from a single variety of green leaf.

At the present time, the carotenes fiind their largest use in the manufacture of margarines, butters, pharmaceuticals, cosmetics, beverage bases for soft drinks, dietary products, and many foods. Some of the more important foods include cheeses, dough products (macaroni, spaghetti, cakes, etc.), cooking oils, mayonnaises, salad dressings, and similar products utilizing the coloring value of egg yolks. Commercial beta-carotenes, whether natural or synthetic, supply both coloring and provitamin A activity to these products. Many cheaper animal feedstuffs are fortified with crude or less purified carotenes such as livestock feeds, cat and dog foods, and poultry feeds.

At the present time, the xanthophylls find many uses in the same products mentioned in connection with the carotenes, but so far as is known, they supply only coloring value since they do not show provitamin A activity. They find large scale use in poultry feeds for the proper development of well colored egg yolks, fatty tissues, shanks, beaks, livers, and feathers which are all characteristic of healthy birds. Annatto and saffron have long supplied the xanthophylls of commerce.

Generally speaking, prior methods of recovery of carotenoids have encountered the problem of emulsion formation that almost defies breaking.

Also, the solvent extractions or separations of the prior art are extremely complicated and unsatisfactory for practical, commercial operations.

Therefore, one of the objects of the present invention is to provide a novel method for recovering carotenoids from papaya plants.

Still a further object is to provide a method of recovering and separating carotenoids from papaya plants.

A further object is to recover carotenoids as a by-product in the recovery of proteolytic enzymes from papaya plants.

Yet a further object is to provide a novel and improved method for recovering carotenoids from plants.

Other objects and advantages will become more apparent from a consideration of the following description and drawing wherein.

Figure 1:
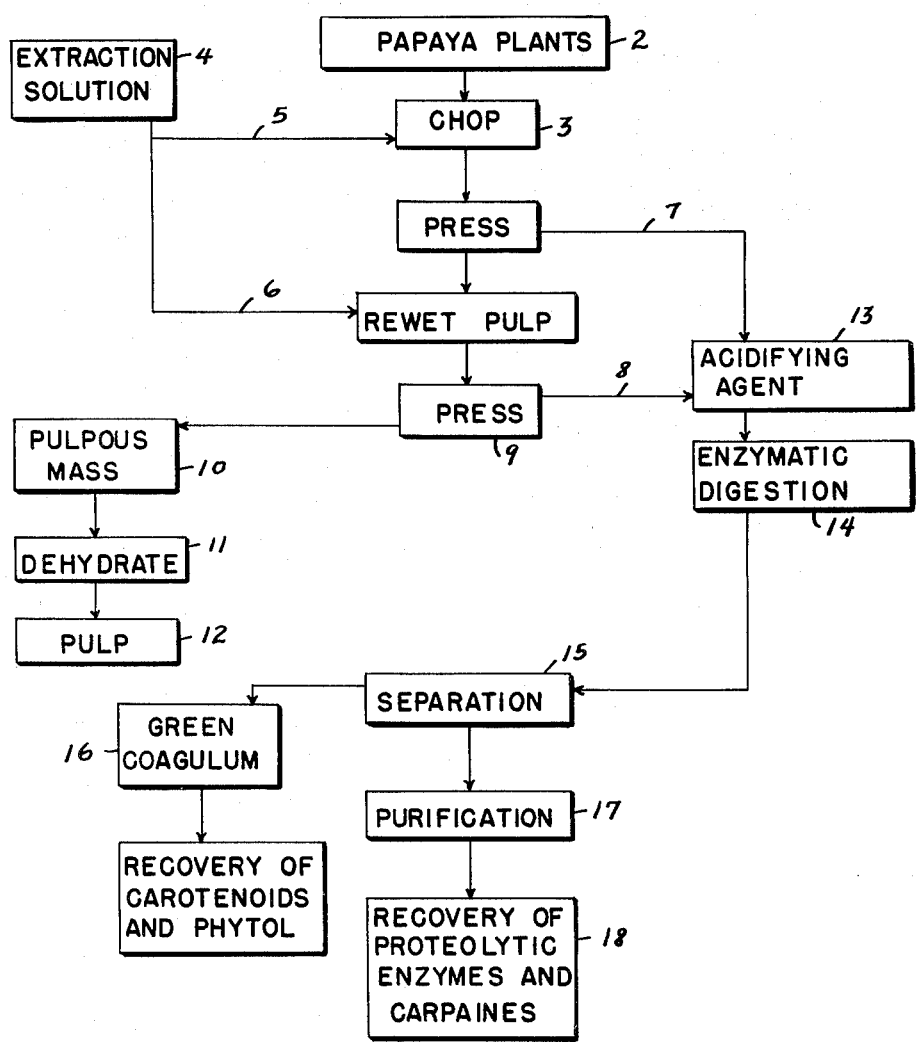
FIG. 1 is a schematic flow diagram illustrating a method of preparing and treating papaya plants to recover carotenoids and proteolytic enzymes therefrom.

Attention is first directed to the flow diagram in FIG. 1 of the drawings.

A suitable method of growing or cultivating papaya plants is described in my copending application Serial No. 1,050, filed January 7, 1960, now U.S. Letters Patent No. 3,141,832, issued July 21, 1964. It can be appreciated that certain variations in the method of growing and cultivation can be utilized without effecting the results of the present invention.

When the plants are of a suitable height, such as, for example, about two or three feet tall, they may be harvested mechanically by a conventional forage harvester or by any suitable other means, and the plants may be cut a suitable height above the ground so that the roots may put out new tops, such as, by way of example, anywhere from 9 to 12 inches above ground.

From the foregoing, it can be appreciated that the above procedure eliminates the necessity of collecting and drying only the papaya leaves for obtaining the carpaines therefrom. Also, such procedure enables not only the leaves but also the stems and trunks of the plants to be used for the production of carotenoids, and it enables other valuable constituents to be recovered from the papaya plants.

As the plants are harvested, it may be advisable to spray the chopped plants with a suitable quantity of preserving solution; such preserving solution may comprise, by way of example, a mixture of ammonia, sulfites, and sulfides in the amount of 0.1% of each by weight. Where the preserving solution is used, the concentration may vary without departing from the scope of the invention but may be restricted by various economic factors. Preferably, the pH of the spraying solution is slightly alkaline or neutral, and a pH range of 7 to 9 is satisfactory.

It is not necessary or critical to the present invention to spray the plants as they are harvested, but the yield of valuable constituents obtained from the harvested or chopped plant may be reduced in some instances where the preserving solution is not utilized.

In addition, it should be further noted that the present process is quite suitable not only for recovering carotenoids and other valuable constituents from green immature plants, but the more mature or older plants that have been raised primarily for fruit may also be used in practicing the present invention.

Attention is now directed to the schematic flow diagram in FIG. 1, and it is to be noted that the harvested plants are represented generally by the numeral 2 and after harvesting may be chopped or macerated as represented by the numberal 3. Where the preserving solution is used, it may be employed by placing it on the plants preferably soon after they are cut or as they are cut or harvested. After chopping the plants, they may be treated with a small quantity of extraction solution to prevent undesirable effects of oxidation and enzyme inactivation. Here again, this step may be eliminated without departing from the scope of this invention. The extraction solution may be added in any suitable manner, and it has been found that spraying the chopped plants with the extraction solution is quite satisfactory. Of course, the chopped plants could be dipped in the extraction solution, or the extraction solution may be applied in any one of several other ways.

Any alkaline enzyme protecting solution may be used as the extraction solution, and one which forms the function of a reducing or antioxidizing agent and a solubilizing or peptizing agent for aiding in the protection, liberation, and activation of the proteolytic enzymes. By way of example, some suitable reducing or antioxidizing agents which have been found suitable are the sulfites and bisulfites of sodium and potassium, sulfur dioxide, the sulfides and hydrosulfides of ammonium, sodium, and potassium, hydrogen sulfide, glutathionine, methionine, cysteine, thioglycolates, and cyanides. Out of this group, the sulfites and bisulfites of sodium and hydrosulfides of ammonium and sodium are preferred, but the others may be used if desired.

Where the enzymes are to be recovered from the same plants, then it is preferable to use or employ a papain-like enzyme activator, such as by way of example, the sulfites of sodium and potassium, the sulfides of sodium and potassium, the bisulfites of sodium and potassium, hydrosulfides and sulfides of ammonium, sodium, and potassium, certain metal chelating agents (versene, sequestrene) like diethylenetetra amino acetic acid and its soluble salts, hydrocyanic acid and its sodium and potassium salts. Among this group, the sulfides of sodium, the bisulfites of sodium, hydrosulfides of ammonium and diethylenetetra amino acetic acid and its soluble salts are preferred.

Among the solubilizing or peptizing agents, the following are desirable: chlorides of sodium and ammonium, phosphates of sodium and potassium, various meta- and polyphosphates of sodium and potassium, sodium citrate, hydrotropic agents such as sodium benzene sulfonate and sodium paracymene sulfonate. Among these, the chlorides of sodium and ammonium, polyphosphates of sodium, and sodium citrate are preferred. Also, sodium sulfite, the bisulfides and sulfides of ammonium and sodium, and ascorbic acid and its soluble salts are quite satisfactory. Generally speaking, any dilute salt solution will function satsfactorily.

Concentration of the chemicals may be in the neighborhood of 0.1% by weight, and concentrations in the range of 0.1% to 0.25% by weight are satisfactory. Lower concentrations are generally ineffective, and higher concentrations are not necessary to accomplish the results.

After the chopped mass of papaya plants has been thoroughly moistened, they are next treated to separate a liquor or liquid from the pulpous mass of the plants; any suitable means may be used to separate the liquids from the pulp, such as, by way of example, pressing. Where pressing is employed, it may be accomplished by any suitable apparatus, such as a filter press or the like to separate the liquid from the pulp. Of course, the liquid may be extracted by any means, mechanical or chemical, which does not have deleterious effects on the desired constituents to be recovered.

It is desirable to rewet the pulpous mass with the extraction solution in order to extract more of the proteolytic enzymes and other constituents, and this may be done by adding to the wet pulp a volume of the extraction solution about equal to the volume of liquid obtained in the first pressing operation. The rewet pulp is then pressed as before to obtain a second portion of liquor and the resulting pulpous mass.

The pulpous mass may be dehydrated in a conventional dehydration kiln to make pulp which can be used as an animal feedstuff which contains a good amount of protein and is quite rich in carotene or provitamin A. In the flow sheet, the extraction solution is illustrated by the numeral 4, and it can be seen that it is added as illustrated at 5 to the chopped papaya plants and is added as illustrated at 6 to the rewet pulp.

After the pressing to separate the liquid from the pulp, the pressings yield 75% to 90% of the total desired constituents. The liquids are combined as illustrated at 7 and 8 for subsequent processing. The pulpous mass obtained from the press 9 is represented at 10 and as noted above is dehydrated at 11 to produce the animal feedstuff represented by the numeral 12.

The two pressings of the plants yield 75% to 90% of the total desired constituents available from the plants, and while more rewettings and pressings give higher yields, the purification difficulties of the enzymes later in the process appear to be increased.

Of course, the number of rewettings and pressings may be varied as desired.

The combined liquors or liquids represented at 7 and 8 from the pressing may be green in color and may have a pH in the neighborhood of 8. At any event, regardless of the color and regardless of the pH, the pH of the liquid is adjusted to between 4.0 and 4.5 by the addition of an acidifying agent as represented by the numeral 13 in the drawing. The acidifying agent may be any suitable acid such as hydrochloric, sulfuric, citric, acetic, or phosphoric, by way of example only.

After the pH of the liquid has been adjusted, the liquid is digested preferably by carefully raising the temperature to approximately between 40° and 55° C. In this regard, it should be noted that any localized overheating of the liquid will tend to destroy the proteolytic enzyme activity. Papain, like all enzymes, is destroyed by heat, but at temperatures below 55° C., the rate of destruction is quite low while at higher temperatures the rate of destruction increases rapidly. The heating of the liquid effects enzymic digestion which liberates and otherwise activates the proteolytic enzymes and at the same time causes a coagulation of the protein impurities.

The enzymic digestion is continued until proper coagulation has been obtained, and I have determined that the time required to produce the desired results usually is between 10 and 30 minutes depending upon the particular papaya plants from which the liquids were obtained. In this regard, if the temperature of the liquid is raised carefully and uniformly, the coagulation will be effected at the lowest possible temperature thereby producing the most active papain from the plants.

The time of heating and the temperature of heating is not critical except that where heating is employed, it must be accomplished in a manner so as to not destroy the proteolytic enzyme activity as the coagulate is being formed. Generally speaking, it is undesirable to heat the liquid to more than 55° C. where it is desired to recover the papain. It can be appreciated that the heating can be carried out at temperatures below 40° C. and over an extended period of time, if desired, one of the primary limiting factors being that the liquid must be digested until a coagulate is formed.

Once the coagulate has been formed, the coagulate can be separated from the liquid by any suitable means such as filtration, centrifugation, or simple settling. The formation of the coagulate may be termed a break which is clearly visible to the eye in that the liquid seems to curdle and separate into coagulum which may be green in color and a clear solution. Of course, any suitable instrumental means may be used to determine the occurrence of this phenomenon.

Since the coagulate is mainly protein, it may be advisable to add some filter aid at this point in order to effect more rapid filtration and optimum clarification of the liquid. The clarified liquid can be further purified by treatment with activated cabons and/or filter aids to produce a relatively sparkling clear solution or liquid, which may then be concentrated from their 3% to 5% solids content to some 30% or 50% solids content by means of vacuum concentration. In this regard, it should be again noted that temperatures above 55° C. should be avoided to prevent loss in enzymic activity.

In the flow diagram, the enzymatic digestion is represented by the numeral 14 and the separation at 15. The coagulate illustrated at 16 is a rich source of chlorophylls, carotenes, xanthophylls, and protein, and the liquids are a good source of carpaines.

My copending applications Serial No. 383,890 and Serial No. 383,889 entitled, respectively, "Method for Recovering Chlorophylls from Papaya Plants" and "Method for Recovering Carpaine from Papaya Plants" describe and claim a process of recovering these products from the green coagulum and the liquids, respectively.

If desired, the protein may be separated from the coagulate 16 and added back to the papaya pulp feedstuff represented by the numeral 12. The generally clear or milky liquid separated from the coagulate is illustrated at 17 as being purified as noted above and concentrated as illustrated at 18 and as noted hereinabove.

The pH of the green coagulum or coagulate is first of all raised from the range of 4.0 to 4.5 to between 7 and 10, preferably between 8 and 9, by the addition of alkalies. Almost any of the cheap nontoxic ones can be used, such as ammonium hydroxide, sodium hydroxide, potassium hydroxide, calcium hydroxide, sodium bicarbonate, and sodium carbonate. Sodium carbonate is preferable primarily because it is quite effective and simple to use. This pH adjustment should be effected as soon as possible to reduce the destructive effects of the acid condition on the chlorophylls and other plants constituents present. If the green coagulum is to be maintained in a moist condition for any length of time, it should also be given a heat treatment or blanch to destroy the enzymes present, especially the remaining proteolytic enzymes and the chlorophyllase (chlorophyllase hydrolyzes phytol from the chlorophylls $a$ and $b$ to form the corresponding chlorophyllides $a$ and $b$). Temperatures in the range of 90° to 100° C. should be maintained for 1 to 5 minutes and should suffice to accomplish this result.

On the other hand, if the slightly alkaline green coagulum is to be dehydrated immediately by high temperature methods, such as by way of example spray drying and drum drying, the heat treatment or blanch can be omitted.

Figure 2:
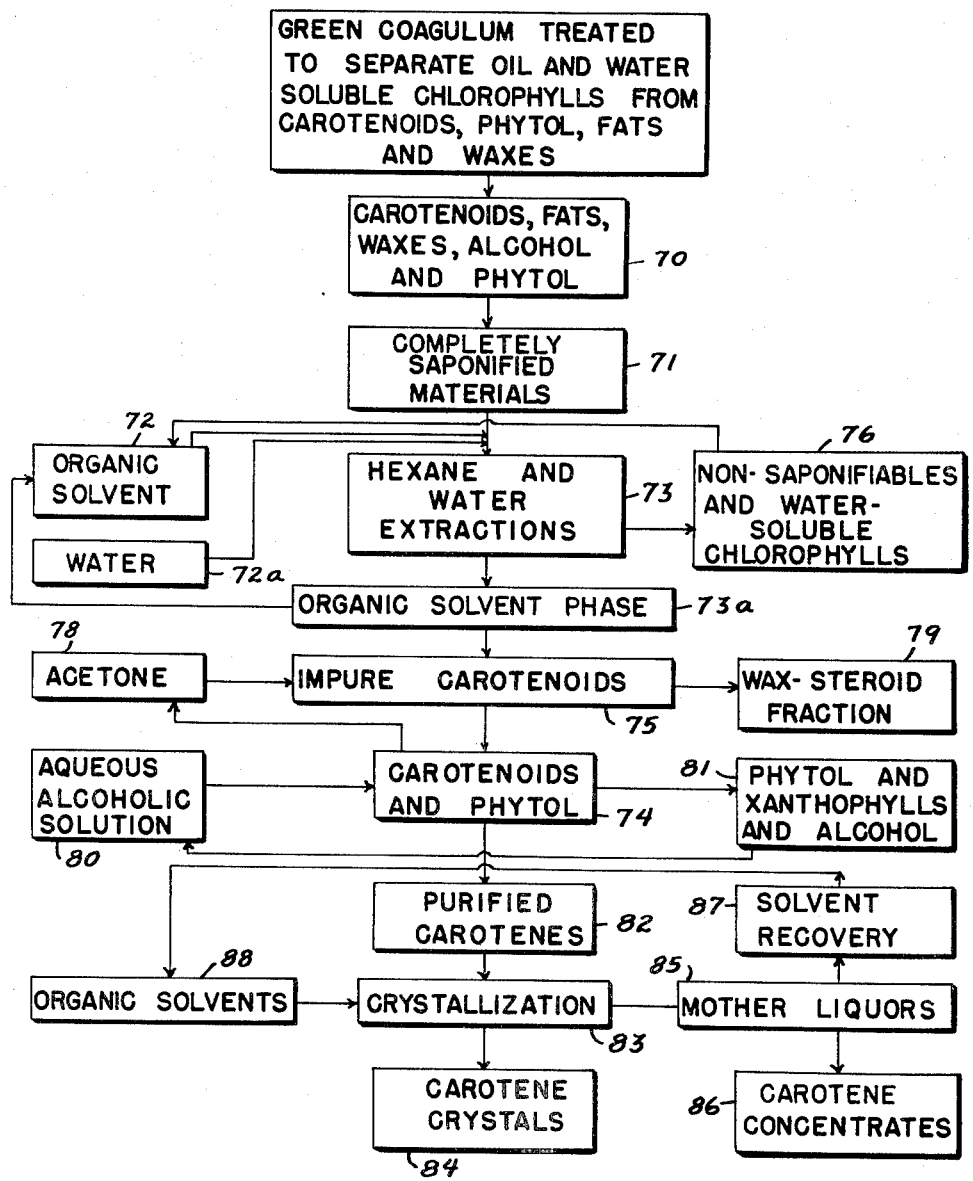
FIG. 2 is a schematic flow diagram illustrating the method of recovering carotene crystals, carotene concentrate, and impure phytol and xanthophyll concentrates from papaya plants.

Attention is next directed to FIG. 2 of the drawings. The carotenoids, fats, waxes, and other similar matter in the coagulum 16 are separated as represented at 70 from the oil and water-soluble chlorophylls present in the coagulum 16 by treating as described and claimed in my copending application Serial No. 383,890 filed July 20, 1964, for "Method for Recovering Chlorophylls from Papaya Plants."

The carotenoid containing material represented at 70 is saponified in any suitable manner as represented at 71; however, it is desired to assure complete saponification which may also be accomplished in any suitable manner. For example, a large excess of potassium hydroxide may be employed, and the material represented at 70 in FIG. 2 is subjected to boiling temperatures for approximately one-half to two hours and a minimal amount of alcohol or just enough to dissolve the excess potassium hydroxide remaining at the end of the reaction.

The completely saponified materials 71 are cooled and dissolved in an organic solvent such as, by way of example, hexane. The resulting mixture is filtered, and the filtrate extracted with water to remove all traces of water-soluble materials in the steps represented at 72, 72a, 73, and 76 in the drawings. The water-soluble phase and organic solvent phase represented at 73 are separated by decantation or any other suitable means. The impure carotenoids fraction represented at 75 is obtained by distilling the organic solvent phase 73a and the organic solvent from this source and the organic solvent recovered from the resulting phase 76 by distillation is returned to the organic solvent source 72. Solvents and low grade water-soluble chlorophylls are recovered from the aqueous phase present in the step 76.

The impure carotenoids at 75 are thoroughly mixed with fifteen to twenty times their weight of a solvent, such as, by way of example, a low molecular weight, water-soluble ketone such as acetone from source 78, and the insoluble waxes, steroids fraction are separated as shown at 79 as by centrifugation or filtration to produce an acetone extract (since acetone is the solvent used for illustration) containing the carotenoids and phytol represented at 74 if the original carotenoid fraction was obtained during the production of the water-soluble chlorophylls. Distillation and return of the acetone to source 78 then results in the carotenoids and phytol fraction or residue. As previously mentioned, the carotenoids include both the carotene fraction and the xanthophyll fraction.

The carotenoids and phytol fraction is then extracted with 5 to 10 times its weight of an aqueous alcoholic solution such as 90% methanol from the source represented at 80 to extract the xanthophylls and phytol represented at 81 and leaving behind the purified carotenes fraction represented at 82. The alcohol in the separated fraction 81 is recovered by distillation and returned to source 80, leaving the impure phytol and xanthophylls fraction 81 which is a good source of both xanthophylls and phytol. Other aqueous alcoholic mixtures having solvent properties similar to those of a 90% methanol solution (i.e., 10% water) can be used, such as, by way of example, ethanol, propanol, and isopropanol.

The xanthophyll and phytol extract 81 is treated as will be described in greater detail with regard to FIG. 3.

The purified carotenes at 82 are first dissolved in isopropanol with the aid of heat and agitation. Upon cooling and standing, a mass of impure carotene crystals is formed represented at 83. These impure carotene crystals are separated and recrystallized from pentane to produce very pure carotene crystals represented at 84. The mother liquors 85 are reprocessed to obtain more pure crystals and carotene concentrate 86 as well as the organic solvents, isopropanol, and pentane by means well known in the art as illustrated at 87 and 88 in FIG. 2.

Figure 3:
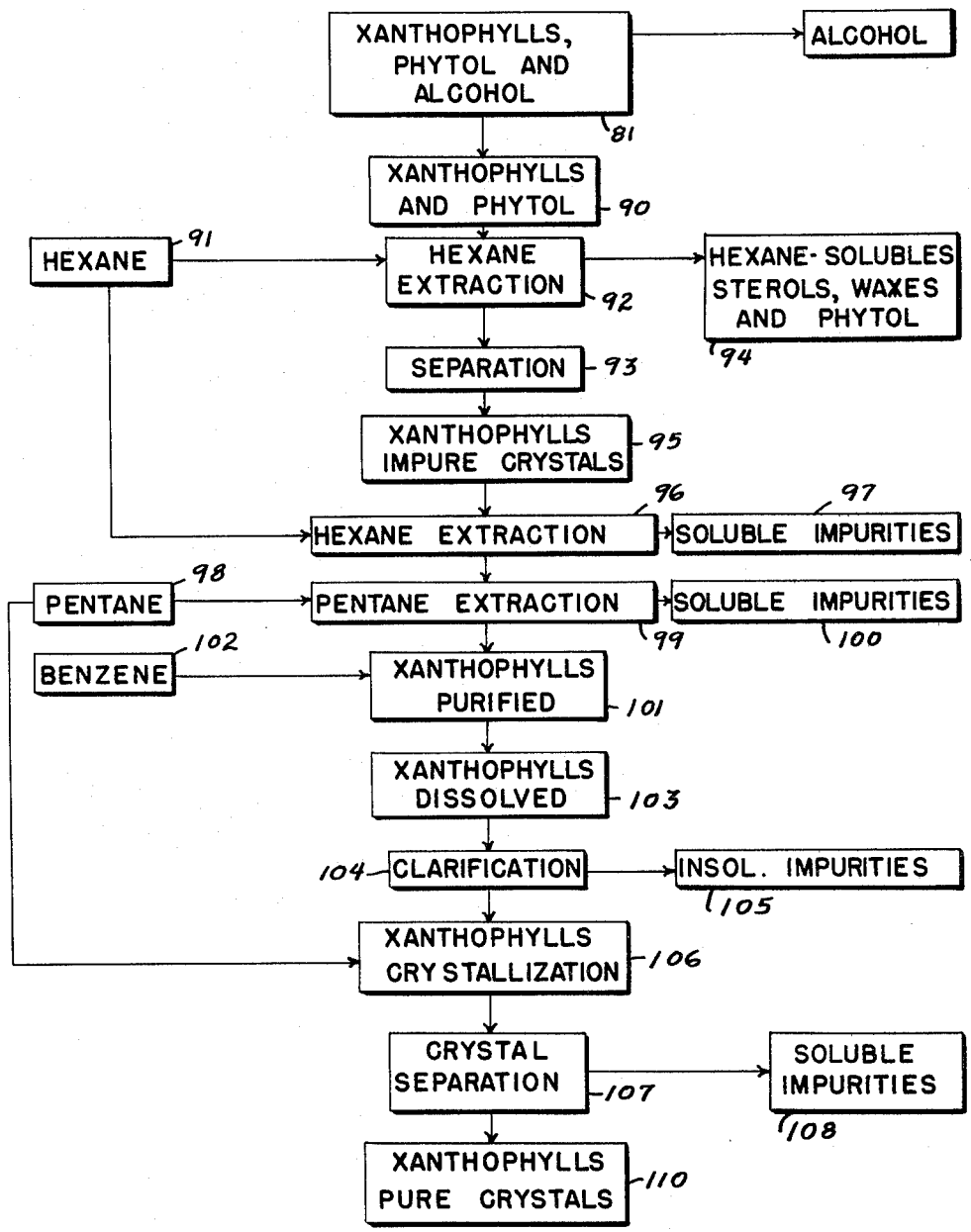
FIG. 3 is a schematic flow diagram illustrating the method of treating and purifying xanthophylls recovered from papaya plants as shown in FIG. 2.

FIG. 3 shows an outlined flow diagram for recovering the carotenoid lutein, a xanthophyll from plants and phytol starting with the combined xanthophylls and phytol fraction 81 of FIG. 2. The separation of the carotenoids and phytol fraction at 74 in FIG. 2 into the phytol and xanthophylls fraction 81 and purified carotenes fraction 82 by means of alcoholic extraction has just been explained. It is necessary to remove all of the alcohol from this material which contains in addition to the xanthophylls, phytol, some carotenes, waxes, sterols, etc., by suitable means such as distillation as previously noted with regard to FIG. 2.

The alcohol free mixture of impure xanthophylls and phytol is represented at 90 and is thoroughly mixed as shown at 92 with between three and four times its weight of purified hexane from source 91 to dissolve the waxes, sterols, and phytol, and the solution is filtered or centrifuged to effect the separation 93 rapidly which produces the hexane solubles, sterols, waxes, and phytol fraction 94 and the impure crystals of xanthophylls 95. This impure crystalline mass of the xanthophylls is repeatedly washed or extracted as represented at 96 with small portions of pure hexane from source 91 until the extracts are colorless. The exact amount of hexane used or the number of extractions will depend entirely upon the amount of impurities in the starting material. These hexane extractions thus remove the hexane soluble impurities represented at 97. Pure pentane from source 98 is then used to wash or extract the impure crystals of xanthophyll as represented at 99 in FIG. 3 of all pentane soluble impurities, just as was done with the hexane. The pentane soluble impurities and pentane are discharged at step 100. The purified xanthophylls represented at 101 are then dissolved in a small amount of benzene from source 102 by the use of both heat and agitation.

The dissolved xanthophylls shown at 103 are then clarified as by filtration or centrifugation represented at 104 to eliminate all insoluble impurities at 105.

Crystallization of the xanthophylls, mainly lutein, is induced by adding pentane from source 98 slowly to the cooled and clarified benzene solution, this step being represented at 106. Preferably, only enough pentane is added to induce the formation of crystals. Crystallization is allowed to continue until the supernatant solution or mother liquor is quite clear and all of the xanthophyll crystals have settled out. The pure xanthophyll crystals represented at 110 are produced by filtering off the mother liquor represented at 107 and washing with a small amount of cold pentane to dissolve impurities represented at 108 and finally drying under vacuum or by infrared heating, preferably in a current of inert gas such as nitrogen or carbon dioxide.

The several steps involved in practicing the present invention will become more obvious and understandable by the following examples which are given merely for purposes of illustration and not by way of limitation.

The present application is a continuation-in-part of my prior copending application Serial No. 1,050 filed January 7, 1960, now United States Letters Patent No. 3,141,832.

*Example 1*

A portion of green coagulum weighing 500 grams wet weight was recovered from green papaya plants as described herein and was treated first with five liters of a solvent mixture containing 75% hexane and 25% acetone by volume in the presence of 5 grams of sodium carbonate. After agitating for thirty minutes and allowing to settle, the supernatant phase was separated.

The residue was mixed with 100 grams of filter aid and treated with a second portion of the 75% hexane 25% acetone solvent mixture, this time being 4 liters, agitating for thirty minutes, and then filtering with suction. The filter cake was washed with 1 liter of 90% hexane 10% acetone solvent mixture. The extracts were combined and filtered. One liter of saturated methanolic postassium hydroxide was added, and the mixture vigorously agitated for fifteen minutes. Upon standing, the aqueous layer of saponified chlorophyll was separated from the hexane layer which hexane layer was then washed with water to produce a clear yellow solution of solvents and nonchlorophylls. The solvents were removed and recovered by distillation leaving as a result a dark orange colored paste containing mainly carotenoids, fats, waxes, other fat soluble constituents, and small amounts of the organic solvents used weighing 48.5 grams. It was treated with 75 ml. of methanol, 25 ml. of acetone, and 20 grams of flake potassium hydroxide under reflux for one hour (reaction is violent, especially at first—caution).

The completely saponified materials were cooled to room temperature and mixed with 2 liters of hexane for ten minutes, filtered through asbestos, and the filtrate extracted with four 250 ml. portions of water to complete the hexane and water extractions which produced the nonsaponifiables and water-soluble chlorophylls and the hexane solubles. Distillation of the hexane effected its recovery and produced 19.4 grams of a pasty residue of impure carotenoids. This was added to 400 ml. of acetone and mixed for thirty minutes, and the insoluble waxes, sterols, etc., separated by filtration, then washed with 100 ml. of fresh acetone.

The filtrates were combined and distilled to recover the acetone and leave a thick viscous residue of carotenoids and phytol weighing about 10.4 grams. This was extracted five times with 25 ml. portions of 90% methanol (10% water). The extracts were combined and evaporated on a steam bath to produce a residue of impure phytol and xanthophylls weighing about 3.8 grams. The extracted residue of purified carotenes resulting from the methanolic extractions weighed 6.3 grams and was dissolved in 125 ml. of isopropanol by stirring and heating. Upon cooling a mass of deep orange colored crystals (poorly formed crystals) separated. After standing overnight, they were recovered by filtration, redissolved in more isopropanol with stirring and heat. Upon cooling, a mass of dark red colored (well formed) crystals of carotenes separated, filtered out, and washed with a small portion of pentane and dried. The yield of carotene crystals was 128 mg. that assayed 96% pure and contained only traces of xanthophylls. The mother liquors were combined, and the solvents removed by heating on a steam bath to produce 5.8 grams of refined carotene. Chemical assay showed this carotene concentrate to contain 2.15% carotenes.

*Example 2*

Fifty grams of the dark orange colored pasty material of carotenoids, fats, waxes, etc., free of solvents that was obtained from fresh green papaya plants as described in copending application entitled, "Method of Cultivating Papaya Plants and for Recovering Proteolytic Enzymes from Papaya Plants," Serial No. 1,050, Patent No. 3,141,-832, copending application entitled, "Method for Recovering Chlorophylls from Papaya Plants," Serial No. 383,890, and Example 1 hereinabove was treated with 75 ml. of methanol. The mixture was brought to a boil with heat and stirring and then 25 grams of flake potassium hydroxide cautiously added. After boiling to the atmosphere for about fifteen minutes, a reflux condenser was connected, and the saponification continued for ninety more minutes to complete the saponification. The completely saponified materials were cooled to room temperature and stirred with 2 liters of hexane for about fifteen minutes, then filtered through asbestos, and the filtrate washed with six 200 ml. portions of water. The impure carotenoids fraction was obtained by distillation of the hexane, then mixed with 400 ml. of acetone for about one hour. The insoluble waxes, sterols, etc., were separated by filtering and washed with a small amount of fresh acetone.

The acetone was removed from the combined filtrates to produce the carotenoids and phytol fraction. It was treated ten times with 25 ml. portions of 90% methanol. Most of the methanol was recovered by fractional distillation of the combined extracts, and the impure phytol and xanthophyll fraction comprising about 3.5 grams was obtained by completely evaporating the solvents on a steam bath. The purified carotenes fraction resulting from the methanolic extractions, when freed of solvents, weighed 6.7 grams. It was dissolved in 100 ml. of heated isopropanol and then let cool, whereupon a mass of deep orange colored material separated. Upon standing for two days, some poorly formed carotene crystals could be seen. The mass was separated from the mother liquor and redissolved in a minimal amount of warmed isopropanol. Upon cooling, well formed carotene crystals formed. These were filtered with suction and washed with cold pentane and dried in a vacuum desiccator. The carotene crystals weighed 142 mg. and assayed more than 95% pure. All mother liquors were combined and freed of solvents on a steam bath, and about 6.3 grams of refined carotene or carotene concentrate containing 2.08% carotenes produced.

*Example 3*

The carotenoids, fats, waxes, etc., fractions resulting from many experiments with recovering proteolytic enzymes and chlorophylls from papaya plants were combined and well mixed. The general methods used to obtain the various carotenoids, fats, waxes, etc., fractions have been described in detail elsewhere ("Method of Cultivating Papaya Plants and for Recovering Proteolytic Enzymes from Papaya Plants," Serial No. 1,050, Patent No. 3,141,832, and "Method for Recovering Chlorophylls from Papaya Plants," Serial No. 383,890, and other examples herein). One hundred grams of this mixture was saponified with a boiling mixture containing 50 grams of potassium hydroxide and 100 ml. of methanol ninety minutes. The saponified mass was cooled and mixed with 3785 ml. of hexane, filtered through asbestos to remove the hexane insoluble material, and the clarified filtrate washed or extracted with water until freed of all water-soluble material.

The hexane was distilled to yield a pasty residue of impure carotenoids which was mixed with 1 liter of acetone for about thirty minutes and the waxes, sterols, etc., separated by filtering. Distillation of the filtrate recovered the acetone and yielded the carotenoids and phytol fraction which was extracted with small portions (25 to 50 ml.) of 90% methanol until the extracts came out practically colorless (this involved some fifteen to twenty extractions). The extracts were combined and practically all of the methanol recovered by fractional distillation. The impure xanthophyll and phytol fraction or residue was the result of further concentration on a steam bath. When solvent free, it weighed about 7.8 grams. The purified carotenes fraction when freed of solvents weighed 14.1 grams, and chemical analysis showed it to contain approximately 780 mg. of carotenes and 280 mg. of xanthophylls. This material was mixed with 200 ml. of isopropanol and dissolved by stirring and carefully heating. The solution was allowed to cool slowly and without the slightest agitation. After several hours, a mass of poorly formed crystals formed; however, they were left standing overnight before being separated by filtration.

These crude carotene crystals were carefully dissolved with stirring and heating in a minimal amount of purified isopropanol (this required between 150 and 180 ml. of isopropanol). Carotene crystals formed as the solution cooled to room temperature, and they were separated by suction filtration. Pentane was added to the filtrate, and more carotene crystals formed which were added to the first batch and washed with a small amount of cold pentane. When dried in a vacuum desiccator, the carotene crystals weighed 412 mg. and were assayed as being 94.5% pure with only traces of xanthophylls. The various mother liquors yielded 12.2 grams of refined carotenes when combined, and the solvents evaporated. Assay showed the presence of 278 mg. of carotene or 2.2% concentration.

*Example 4*

Eighty grams of impure xanthophylls and phytol obtained by combining many smaller portion prepared in experiments similar to the previous examples given to illustrate the method for recovering carotene crystals and refined carotenes and freed of solvents was added to 3785 ml. of pure hexane and gently stirred for about ten minutes. The mass of insoluble pure xanthophyll crystals was separated from the hexane soluble materials by suction filtration. This crude mass was washed with several 100 ml. portions of cold hexane (2–5° C.) until the filtrate came through practically colorless. It was then similarly treated with cold pentane (2–5° C.). The thusly prepared purified xanthophyll semicrystalline mass was dissolved in about 15 ml. of benzene by stirring and heating and then clarified by filtration through fine filter paper. Pentane was added slowly with mild stirring until the first sign of crystal formation could be seen and then let stand undisturbed overnight by which time all of the crystals had settled to the bottom. The red-brownish xanthophyll crystals were separated by decantation and filtration. They were washed with a small amount of cold pentane (2–5° C.) and dried in a vacuum desiccator. A yield of 675 mg. of deep reddish brown pure xanthophyll crystalls was otbained that assayed 99.9% pure as lutein.

*Example 5*

A fifty gram portion of the impure xanthophylls and phytol obtained as previously described and accumulated over several months' time was partially dissolved by stirring with 2.5 liters of hexane. The insoluble impure xanthophyll crystals were separated by filtering under suction in a Buchner funnel fitted with filter paper and then washed with five 100 ml. portions of cold (2–5° C.) hexane and next with three 100 ml. portions of cold (2–5° C.) pentane. The washed and purified xanthophyll fraction was dissolved in about 15 ml. of hot benzene and rapidly filtered while still hot. Pentane was added slowly to the filtered benzene solution until xanthophyll crystals began to form. Crystallization was allowed to continue until a clear supernatant solution was formed, and the crystals settled out. The red-brown crystals were separated by filtration, washed with a small portion of cold (2–5° C.) pentane, and dried in a desiccator under vacuum. When completely dry, the pure xanthophyll crystals weighed 362 mg. and assayed 100% pure as the xanthophyll lutein.

What is claimed is:

1. A method of separating carotenes, xanthophylls, and phytol from papaya plants comprising the steps of:
   (a) treating the plants to recover a liquid portion,
   (b) adjusting the pH of the liquid to 4.0–4.5,
   (c) digesting the liquid portion to form a coagulate,
   (d) neutralizing the coagulate,
   (e) separating a carotenoid containing fraction from the coagulate,
   (f) saponifying the carotenoid containing fraction,
   (g) dissolving the carotenoid containing fraction in an organic solvent,
   (h) filtering the resulting mixture to obtain a filtrate,
   (i) extracting the filtrate with water to remove water solubles therefrom,
   (j) separating the water phase and organic solvent phase containing the carotenoids,
   (k) separating the carotenoids from the organic solvent phase,
   (l) mixing the carotenoids with a low molecular weight water-soluble ketone,
   (m) separating the resulting filtrate from the residue,
   (n) separating the solvent from the filtrate to obtain a carotenoids and phytol fraction, and
   (o) extracting the carotenoids and phytol fraction with an aqueous alcoholic solution to separate the phytols and xanthophylls from the carotenes.

2. A method of separating carotenes, xanthophylls, and phytol from papaya plants comprising the steps of:
   (a) treating the plants to recover a liquid portion,
   (b) adjusting the pH of the liquid to 4.0–4.5,
   (c) digesting the liquid portion to form a coagulate,
   (d) neutralizing the coagulate,
   (e) separating a carotenoid and chlorophyll containing fraction from the coagulate,
   (f) saponifying the carotenoid containing fraction,
   (g) dissolving the carotenoid containing fraction in an organic solvent,
   (h) filtering the resulting mixture to obtain a filtrate,
   (i) extracting the filtrate with water to remove water solubles therefrom, (j) separating the water phase and organic solvent phase containing the carotenoids,
(k) separating the carotenoids from the organic solvent phase,
(l) mixing the carotenoids with a low molecular weight water-soluble ketone,
(m) separating the resulting filtrate from the residue,
(n) separating the solvent from the filtrate to obtain a carotenoids and phytol fraction,
(o) extracting the carotenoids and phytol fraction with an aqueous alcoholic solution to separate the phytols and xanthophylls from the carotenes, and
(p) purifying the separated carotenes.

3. A method of separating carotenes, xanthophylls, and phytol from papaya plants comprising the steps of:
(a) treating the plants to recover a liquid portion,
(b) adjusting the pH of the liquid to 4.0–4.5,
(c) digesting the liquid portion to form a coagulate,
(d) neutralizing the coagulate,
(e) separating a carotenoid and chlorophyll containing fraction from the coagulate,
(f) saponifying the carotenoid containing fraction,
(g) dissolving the carotenoid containing fraction in an organic solvent,
(h) filtering the resulting mixture to obtain a filtrate,
(i) extracting the filtrate with water to remove water solubles therefrom,
(j) separating the water phase and organic solvent phase containing the carotenoids,
(k) separating the carotenoids from the organic solvent phase,
(l) mixing the carotenoids with a low molecular weight water-soluble ketone,
(m) separating the resulting filtrate from the residue,
(n) separating the solvent from the filtrate to obtain a carotenoids and phytol fraction,
(o) extracting the carotenoids and phytol fraction with an aqueous alcoholic solution to separate the phytols and xanthophylls from the carotenes,
(p) purifying the separated carotenes, and
(q) separating the xanthophylls from the phytol fraction.

4. A method of separating carotenes, xanthophylls, and phytol from papaya plants comprising the steps of:
(a) treating the plants to recover a liquid portion,
(b) adjusting the pH of the liquid to 4.0–4.5,
(c) digesting the liquid portion to form a coagulate,
(d) neutralizing the coagulate,
(e) separating a carotenoid and chlorophyll containing fraction from the coagulate,
(f) saponifying the carotenoid containing fraction,
(g) dissolving the carotenoid containing fraction in an organic solvent,
(h) filtering the resulting mixture to obtain a filtrate,
(i) extracting the filtrate with water to remove water solubles therefrom,
(j) separating the water phase and organic solvent phase containing the carotenoids,
(k) separating the carotenoids from the organic solvent phase,
(l) mixing the carotenoids with a low molecular weight water-soluble ketone,
(m) separating the resulting filtrate from the residue,
(n) separating the solvent from the filtrate to obtain a carotenoids and phytol fraction,
(o) extracting the carotenoids and phytol fraction with an aqueous alcoholic solution to separate the phytols and xanthophylls from the carotenes,
(p) purifying the separated carotenes,
(q) separating the xanthophylls from the phytol fraction, and
(r) purifying the xanthophyll.

5. A method of separating carotenes, xanthophylls, and phytol from papaya plants comprising the steps of:
(a) treating the plants to recover a liquid portion,
(b) adjusting the pH of the liquid to 4.0–4.5,
(c) digesting the liquid portion to form a coagulate,
(d) neutralizing the coagulate,
(e) separating a carotenoid containing fraction from the coagulate,
(f) saponifying the carotenoid containing fraction,
(g) dissolving the carotenoid containing fraction in an organic solvent,
(h) filtering the resulting mixture to obtain a filtrate,
(i) extracting the filtrate with water to remove water solubles therefrom,
(j) separating the water phase and organic solvent phase containing the carotenoids,
(k) separating the carotenoids from the organic solvent phase,
(l) mixing the carotenoids with a low molecular weight water-soluble ketone,
(m) separating the resulting filtrate from the residue,
(n) separating the solvent from the filtrate to obtain a carotenoid fraction, and
(o) extracting the carotenoid fraction with an aqueous alcoholic solution to separate the xanthophylls from the carotenes.

6. A method of separating carotenes, xanthophylls, and phytol from papaya plants comprising the steps of:
(a) treating the plants to recover a liquid portion,
(b) adjusting the pH of the liquid to 4.0–4.5,
(c) digesting the liquid portion to form a coagulate,
(d) neutralizing the coagulate,
(e) separating a carotenoid and chlorophyll containing fraction from the coagulate,
(f) saponifying the carotenoid containing fraction,
(g) dissolving the carotenoid containing fraction in an organic solvent,
(h) filtering the resulting mixture to obtain a filtrate,
(i) extracting the filtrate with water to remove water solubles therefrom,
(j) separating the water phase and organic solvent phase containing the carotenoids,
(k) separating the carotenoids from the organic solvent phase,
(l) mixing the carotenoids with a low molecular weight water-soluble ketone,
(m) separating the resulting filtrate from the residue,
(n) separating the solvent from the filtrate to obtain a carotenoids and phytol fraction,
(o) extracting the carotenoids and phytol fraction with an aqueous alcoholic solution to separate the phytols and xanthophylls from the carotenes,
(p) dissolving the carotenes in isopropanol,
(q) letting the resulting solution stand to form crystals of carotenes,
(r) separating the crystals of carotenes,
(s) recrystallizing the crystals of carotenes from pentane, and
(t) processing the mother liquors to recover more carotenes.

7. A method of separating carotenes and xanthophylls from papaya plants comprising the steps of:
(a) treating the plants to recover a liquid portion,
(b) adjusting the pH of the liquid to 4.0–4.5,
(c) digesting the liquid portion to form a coagulate,
(d) neutralizing the coagulate,
(e) separating a carotenoid and chlorophyll containing fraction from the coagulate,
(f) saponifying the carotenoid containing fraction,
(g) dissolving the carotenoid containing fraction in an organic solvent,
(h) filtering the resulting mixture to obtain a filtrate,
(i) extracting the filtrate with water to remove water solubles therefrom,
(j) separating the water phase and organic solvent phase containing the carotenoids,
(k) separating the carotenoids from the organic solvent phase, (l) mixing the carotenoids with a low molecular weight water-soluble ketone,
(m) separating the resulting filtrate from the residue,
(n) separating the solvent from the filtrate to obtain a carotenoid and xanthophyll fraction,
(o) extracting the carotenoids and xanthophyll fraction with an aqueous alcoholic solution to separate the xanthophylls from the carotenes,
(p) separating the alcoholic solution from the xanthophylls,
(q) washing the xanthophyll fraction with hexane to separate hexane solubles from the xanthophylls,
(r) washing the remaining xanthophyll with pentane to separate pentane solubles from the xanthophylls,
(s) dissolving the resulting xanthophylls in benzene,
(t) adding pentane to the solution of benzene and xanthophylls to induce the formation of xanthophyll crystals, and
(u) separating and drying the resulting xanthophyll crystals.

References Cited by the Examiner

UNITED STATES PATENTS 3,141,832   7/1964   Burdick _____ 195—66

OTHER REFERENCES

Burdick: Chemurgic Digest 12, 11 to 13, June–July 1953.

Burdick et al.: Industrial and Engineering Chemistry, vol. 46, pp. 2262–2271, November 1954.

Burdick: Economic Botany 10, 267–279 (1956).

Burdick: Chemurgic Digest 16, No. 7, pp. 4 to 6 and 12, July 1957.

A. LOUIS MONACELL, *Primary Examiner.*